United States Patent
De Cacqueray et al.

(10) Patent No.: US 10,048,394 B2
(45) Date of Patent: Aug. 14, 2018

(54) SYSTEM AND METHOD FOR DISCONTINUOUS SPECTRUM EMISSION IN SEISMIC EXPLORATION

(71) Applicant: CGG Services SA, Massy (FR)

(72) Inventors: Benoit De Cacqueray, Massy (FR); Cecile Berron, Massy (FR)

(73) Assignee: CGG SERVICES SAS, Massy (FR)

( * ) Notice: Subject to any disclaimer, the term of this patent is extended or adjusted under 35 U.S.C. 154(b) by 152 days.

(21) Appl. No.: 15/026,541

(22) PCT Filed: Sep. 29, 2014

(86) PCT No.: PCT/EP2014/070818
§ 371 (c)(1),
(2) Date: Mar. 31, 2016

(87) PCT Pub. No.: WO2015/049209
PCT Pub. Date: Apr. 9, 2015

(65) Prior Publication Data
US 2016/0245937 A1    Aug. 25, 2016

Related U.S. Application Data

(60) Provisional application No. 61/919,302, filed on Dec. 20, 2013, provisional application No. 61/885,025, filed on Oct. 1, 2013.

(51) Int. Cl.
*G01V 1/38* (2006.01)
*G01V 1/00* (2006.01)

(52) U.S. Cl.
CPC ............ *G01V 1/005* (2013.01); *G01V 1/3861* (2013.01)

(58) Field of Classification Search
CPC ..... G01V 1/005; G01V 1/3808; G01V 1/3861
(Continued)

(56) References Cited

U.S. PATENT DOCUMENTS 3,259,878 A * 7/1966 Mifsud ................ G06G 7/1914
                                                            367/49
3,886,493 A * 5/1975 Farr ......................... G01V 1/04
                                                            367/189

(Continued)

FOREIGN PATENT DOCUMENTS

EP  2624015  8/2013
GB  2495801  4/2013

OTHER PUBLICATIONS

International Search Report, Application No. PCT/EP2014/070818, 5 pages, dated Mar. 25, 2015.
(Continued)

*Primary Examiner* — Ian J Lobo
(74) *Attorney, Agent, or Firm* — Patent Portfolio Builders PLLC

(57) ABSTRACT

A system and method for discontinuous spectrum emission in seismic exploration is disclosed. The method may include determining a minimum frequency to be emitted by a seismic source in a frequency spectrum. The method may further include selecting a maximum frequency to be emitted by the seismic source in the frequency spectrum. The method may include identifying a portion of the spectrum between the minimum frequency and the maximum frequency where a reduced signal will be emitted by the seismic source. The method may finally include emitting, by the seismic source, a seismic signal according to the frequency spectrum and the identified portion of the frequency spectrum with the reduced signal.

20 Claims, 6 Drawing Sheets

(58) Field of Classification Search
USPC .......................................... 367/23, 49, 189
See application file for complete search history.

(56) References Cited

U.S. PATENT DOCUMENTS

| | | | |
|---|---|---|---|
| 4,004,267 A * | 1/1977 | Mayne | G01V 1/005 367/189 |
| 4,293,935 A | 10/1981 | Pierre et al. | |
| 4,598,392 A * | 7/1986 | Pann | G01V 1/005 367/189 |
| 2007/0286019 A1 | 12/2007 | Love et al. | |
| 2011/0085416 A1 | 4/2011 | Sallas | |
| 2012/0155217 A1 | 6/2012 | Dellinger et al. | |
| 2013/0033961 A1 | 2/2013 | Burnstad | |
| 2013/0163385 A1 | 6/2013 | Sallas | |

OTHER PUBLICATIONS

International Written Opinion, Application No. PCT/EP2014/070818, 6 pages, dated Mar. 25, 2015.
Candès, Emmanuel J. et al., "Phase Retrieval via Matrix Completion," SIAM Journal of Imaging Sciences, vol. 6, No. 1, pp. 199-225, 2013.
Candès, Emmanuel J. et al., "Stable Signal Recovery from Incomplete and Inaccurate Measurements". Communications on Pure and Applied Mathematics, vol. LIX, pp. 1207-1223, 2006.

* cited by examiner

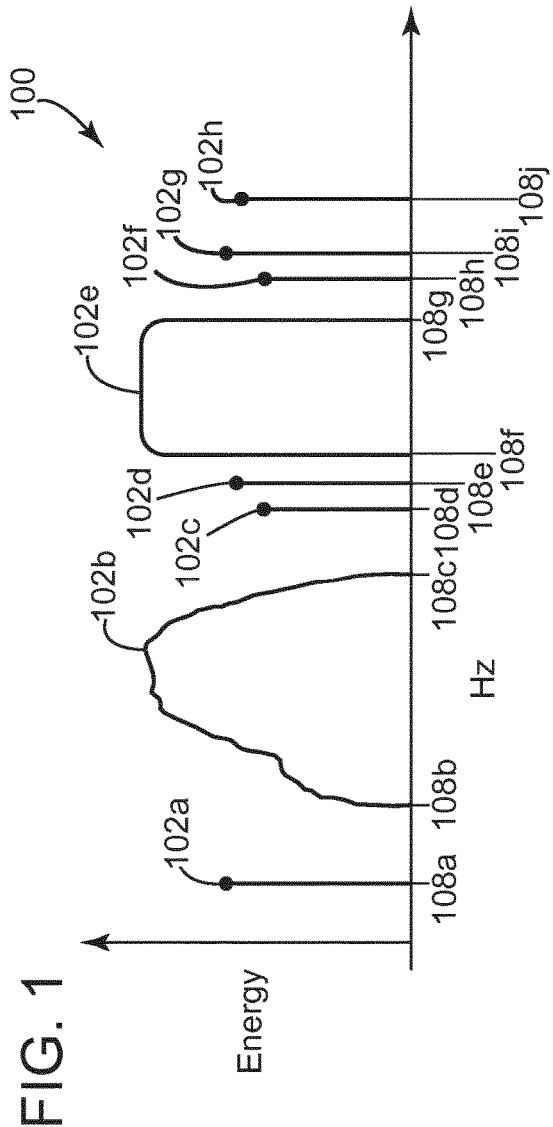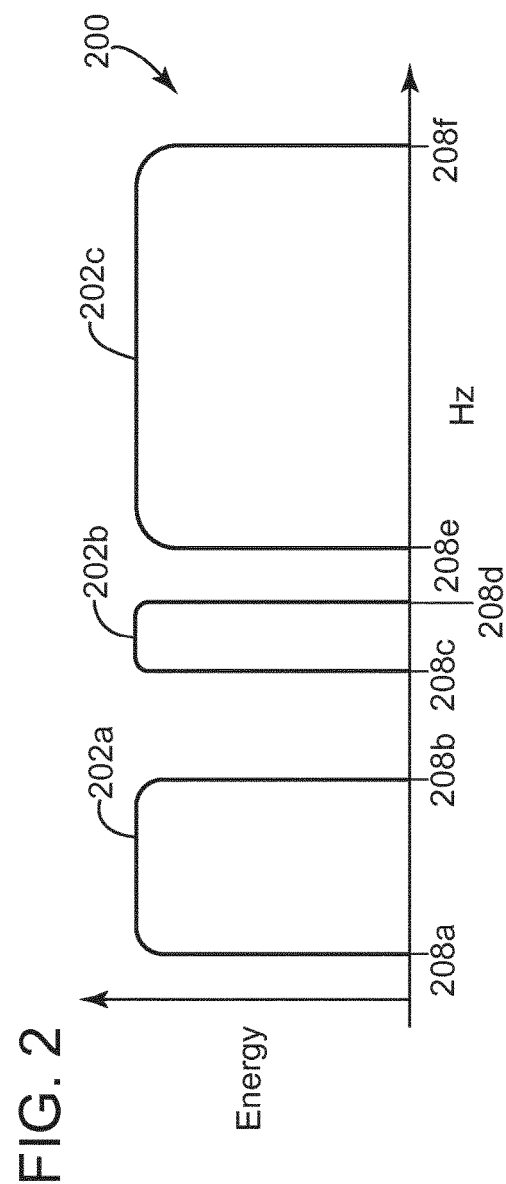

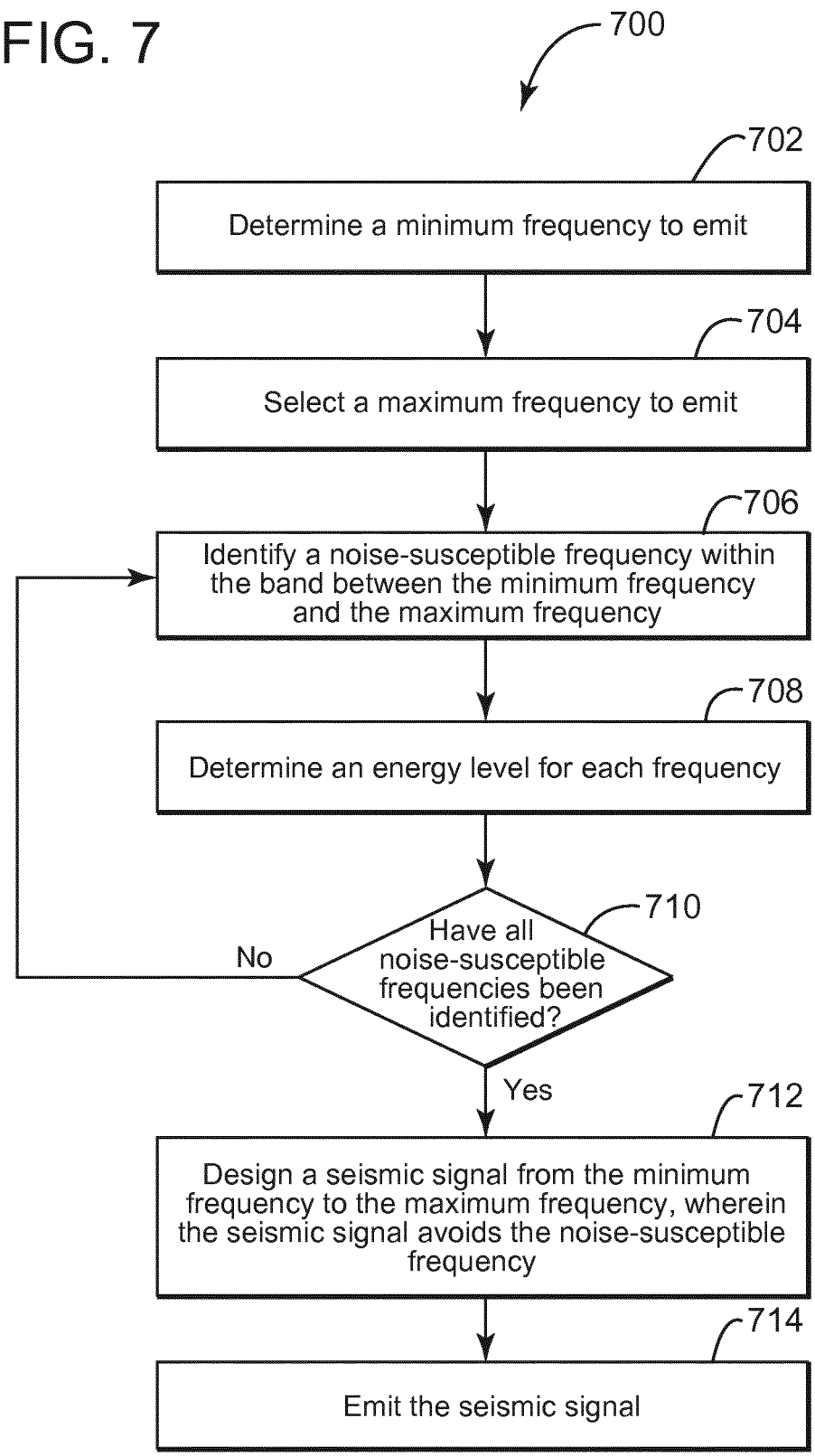

SYSTEM AND METHOD FOR DISCONTINUOUS SPECTRUM EMISSION IN SEISMIC EXPLORATION

CROSS-REFERENCE TO RELATED APPLICATIONS

The present application is a U.S. National Stage Application of International Application No. PCT/EP2014/070818 filed Sept. 29, 2014, which designates United States, and which claims the benefit of priority under 35 U.S.C. § 119 from U.S. Provisional Application Ser. No. 61/919,302, filed on Dec. 20, 2013 and U.S. Provisional Patent Application Ser. No. 61/885,025, filed on Oct. 1, 2013, which are incorporated by reference in their entirety for all purposes.

TECHNICAL FIELD

The present disclosure relates generally to seismic exploration tools and processes and, more particularly, to a system and method for discontinuous spectrum emission in seismic exploration.

BACKGROUND

In the oil and gas industry, geophysical survey techniques are commonly used to aid in the search for and evaluation of subterranean hydrocarbon or other mineral deposits. Generally, a seismic energy source, or "source," generates a seismic signal that propagates into the earth and is partially reflected by subsurface seismic interfaces between underground formations having different acoustic impedances. The reflections are recorded by seismic detectors, or "receivers," located at or near the surface of the earth, in a body of water, or at known depths in boreholes, and the resulting seismic data can be processed to yield information relating to the location and physical properties of the subsurface formations. Seismic data acquisition and processing generates a profile, or image, of the geophysical structure under the earth's surface. While this profile does not provide an accurate location for oil and gas reservoirs, it suggests, to those trained in the field, the presence or absence of them. Thus, providing a high-resolution image of the subsurface is an ongoing process.

Various sources of seismic energy have been used to impart the seismic waves into the earth. Such sources have included two general types: 1) impulsive energy sources and 2) seismic vibrator sources. The first type of geophysical prospecting utilizes an impulsive energy source, such as dynamite or a marine air gun, to generate the seismic signal. With an impulsive energy source, a large amount of energy is injected into the earth in a very short period of time. In the second type of geophysical prospecting, a vibrator is used to propagate energy signals over an extended period of time, as opposed to the near instantaneous energy provided by impulsive sources.

The seismic process employing such use of a seismic vibrator, sometimes referred to as "vibroseis," propagates energy signals into the earth over an extended period of time. The data recorded in this way is then correlated to convert the extended source signal into an impulse. In land-based implementations. the source signal is generally generated by a servo-controlled hydraulic vibrator, or "shaker unit," mounted on a mobile base unit. In marine implementations, vibrators typically include a bell-shaped housing with a large and heavy diaphragm in its open end. The vibrator is lowered into the water from a marine survey vessel, and the diaphragm is vibrated by a hydraulic drive system similar to that used in a land vibrator. Except where expressly stated herein, "source" is intended to encompass any seismic source implementation, both impulse and vibratory, including any dry land or marine implementations thereof.

Vibrators typically employ a sweep generator to control the vibratory source signal emitted by the vibrator. The output of the sweep generator dictates the manner in which the frequency of the emitted signal, which is imparted into the earth, varies as a function of time. Typically, the impartation of energy with a vibrator is for a preselected time interval. The vibrator radiates energy at varying frequencies into the earth's crust during the preselected time interval or "sweep." In such instances, energy at a starting frequency is first imparted into the earth, and the vibration frequency changes over the sweep interval at some rate until the stopping frequency is reached at the end of the interval. The difference between the starting and stopping frequencies of the sweep generator is known as the range of the sweep, and the amount of time used to sweep through those frequencies is known as the sweep time.

A sweep may have various characteristics. A sweep may be linear such that the frequency changes linearly over the sweep time at a rate dictated by the range of the sweep and the sweep time. In contrast, a sweep may be nonlinear such that the frequency varies nonlinearly between the starting and stopping frequencies over the sweep time. For example, in conventional systems, a nonlinear sweep may include a quadratic sweep or a logarithmic sweep. A sweep is continuous such that the source generates substantially all frequencies between the starting and stopping frequency.

Seismic sweeps often have durations between two and twenty seconds. The instantaneous frequency of the seismic sweep may vary linearly or nonlinearly with time. The instantaneous frequency is the time derivative of the instantaneous phase of the seismic signal. The ratio of the instantaneous frequency variation over the unit time interval is defined as the sweep rate. Further, the frequency of the seismic sweep may start at a low frequency and increase with time, called "an upsweep," or it may begin at a high frequency and gradually decrease, known as "a downsweep." Typically, the frequency range is from about two Hertz (Hz) to an upper limit that is often less than two-hundred Hz, most commonly about one-hundred Hz. In the case of sweep usage, the recorded signal is correlated with the emitted sweep in order to retrieve a wavelet form providing the time information.

The seismic signal is emitted in the form of a wave that is reflected off interfaces between geological layers. Typical seismic exploration may involve the creation of two types of source waves: surface waves and body waves. Surface waves are the waves that travel along the earth's surface when the seismic energy signal is emitted. Body waves travel into the interior of the earth and generate the reflected waves, such as P-waves (primary waves) and S-waves (secondary waves). A P-wave is the most commonly used form of seismic wave. P-waves cause particles to oscillate parallel to the direction in which the wave propagates. An S-wave, generated by most land seismic sources and sometimes by converted P-waves, is a wave in which particles oscillate perpendicular to the direction in which the wave propagates. In some cases, S-waves can be converted to P-waves. When the wave encounters an interface between different media in the earth's subsurface a portion of the wave is reflected back to the earth's surface while the remainder of the wave is refracted through the interface.

The reflected waves are received by an array of geophones, or receivers, located at the earth's surface, which convert the displacement of the ground resulting from the propagation of the waves into an electrical signal recorded by means of recording equipment. The receivers typically record data during the source's sweep interval and during a subsequent "listening" interval. The receivers record the time at which each reflected wave is received. The travel time from source to receiver, along with the velocity of the source wave, can be used to reconstruct the path of the waves to create an image of the subsurface.

A large amount of data may be recorded by the receivers and the recorded signals may be subjected to signal processing before the data is ready for interpretation. The recorded seismic data may be processed to yield information relating to the location of the subsurface reflectors and the physical properties of the subsurface formations. That information is then used to generate an image of the subsurface.

As described above, in conventional systems, a seismic signal is emitted featuring a continuous spectrum, emitting all frequencies. The emitted signal may cover a large bandwidth to enhance wavelet quality and improve geophysical inversion modeling results. However, there may be some frequencies, referred to as noise-susceptible frequencies, within the sweep range where the signal-to-noise ratio of the reflected signal may be low and may create a lack of information for signal processing use in those noise-susceptible frequency bands. When the signal-to-noise ratio of the reflected signal is unusable the data processing system will lack information to enable imaging of the subsurface formations at noise-susceptible frequencies. Further, seismic exploration efficiency is reduced when the source emits a signal that does not return a usable reflected signal. Accordingly, it would be desirable to provide systems and methods that do not emit a seismic signal at noise-susceptible frequencies and improve the seismic exploration efficiency to avoid the previously described problems and drawbacks.

SUMMARY

In accordance with embodiments of the present disclosure, a method of discontinuous spectrum emission in seismic exploration is disclosed. The method includes determining a minimum frequency to be emitted by a seismic source in a frequency spectrum. The method further includes selecting a maximum frequency to be emitted by the seismic source in the frequency spectrum. The method includes identifying a portion of the frequency spectrum between the minimum frequency and the maximum frequency where a reduced signal is to be emitted by the seismic source. The method also includes emitting, by the seismic source, a sesimic signal according to the frequency spectrum and the identified portion of the frequency spectrum with the reduced signal.

In accordance with another embodiment of the present disclosure, a seismic exploration system includes a seismic energy source configured to emit a seismic signal into a subsurface geology. The seismic signal is based on determining a minimum frequency to be emitted by the seismic source in a frequency spectrum, and selecting a maximum frequency to be emitted by the seismic source in the frequency spectrum. The seismic signal is further based on identifying a portion of the frequency spectrum between the minimum frequency and the maximum frequency where a reduced signal is to be emitted by the seismic source. The system also includes a receiver configured to receive energy from the seismic energy source reflected off of the subsurface geology.

In accordance with further embodiments of the present disclosure, a non-transitory computer-readable medium includes computer-executable instructions carried on the computer-readable medium. The instructions, when executed, cause a processor to determine a minimum frequency to be emitted by a seismic source in a frequency spectrum. The instructions also cause a processor to select a maximum frequency to be emitted by the seismic source in the frequency spectrum. The instructions further cause a processor to identify a portion of the frequency spectrum between the minimum frequency and the maximum frequency where a reduced signal is to be emitted. The instructions cause a processor to emit, by the seismic source, a seismic signal according to the frequency spectrum and the identified portion of the frequency spectrum with the reduced signal.

BRIEF DESCRIPTION OF THE DRAWINGS

For a more complete understanding of the present invention and its features and advantages, reference is now made to the following description, taken in conjunction with the accompanying drawings, in which like reference numbers indicate like features and wherein:

FIG. 1 illustrates a graph of emitted signals, where the emitted signals are emitted with a discontinuous spectrum, in accordance with some embodiments of the present disclosure;

FIG. 2 illustrates a graph of emitted signals, where the emitted signals are emitted with a constant energy level, in accordance with some embodiments of the present disclosure;

FIG. 7 illustrates a flow chart of an example method for discontinuous spectrum emission in seismic exploration in accordance with some embodiments of the present disclosure.

DETAILED DESCRIPTION

Figure 3:
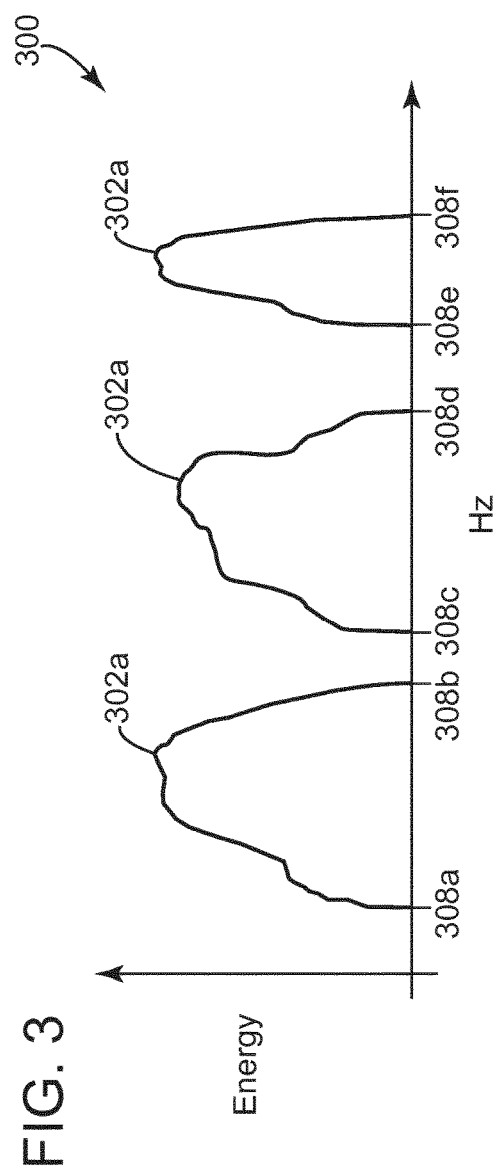
FIG. 3 illustrates a graph of emitted signals, where the emitted signals are emitted with variable energy levels, in accordance with some embodiments of the present disclosure.

Seismic systems that use signals covering a range of frequencies are more susceptible to harmful noise at certain frequencies relative to other frequencies. Therefore, according to the teachings of the present disclosure, systems and methods are presented that omit or reduce certain frequencies as the seismic signal is emitted or otherwise manage certain frequencies, for example noise-susceptible or less informative frequencies. More specifically, a seismic signal that is emitted in a discontinuous manner may result in reflected energy with higher signal-to-noise ratios (SNR) as well as greater seismic exploration efficiency. The ratio of the reflected energy received by the receivers to the noise energy received by the receivers at a particular frequency is the SNR. A low SNR occurs when the noise energy is high relative to the reflected energy. Noise energy may be due to source signal attenuation, spherical divergence, ambient noise (from motors, generators, pumps, and other mechanical components near the source or the receiver), interference of multiple wave types, or other sources of interference. Noise energy is not constant over the frequency range. It is higher in some portions of the spectrum than other portions. Increasing the SNR through the use of discontinuous spectrum emission may reduce the amount of unusable data that would typically be created through a classical continuous spectrum emission. Additionally, emitting a signal only in a subset of frequencies within the useful bandwidth may save time and increase the acquisition efficiency. For example, if the discontinuous spectrum signal emits ten times fewer frequencies but with twice the energy level (in other words, double the time spent at each frequency), the result will be a gain of five with regards to emission duration and a gain of two (such as 6 decibels) with regard to the SNR. Further, the discontinuous spectrum signal may be designed to avoid frequencies that may result in spatial aliasing, interference or overlap.

The discontinuous seismic signal can take a variety of forms. A discontinuous seismic signal can be emitted as a set of discontinuous seismic sweeps, a set of individual frequencies, known as monofrequencies, or any combination of sweeps and mono frequencies. A discontinuous seismic signal may not emit any seismic energy at frequencies known to have a low SNR and thus conserve energy for other frequencies or conserve seismic exploration time. Alternatively, a discontinuous seismic signal may instead emit seismic energy at frequencies known to have a low SNR, but emit the signal at a higher energy level to increase the signal strength of the reflected energy and thus increase the SNR at those frequencies. This can occur when the corresponding frequencies carry useful information. A discontinuous seismic signal can also include a continuous seismic signal where the emitted signal is reduced instead of completely omitted at certain frequencies. A reduction may be to a lower energy level and may also include a reduction to zero, resulting in no signal emission at the selected frequencies. The design of a discontinuous seismic signal and the systems needed to create it are further understood with reference to the figures and the following discussion.

As one example form of a discontinuous seismic signal, FIG. 1 illustrates a graph 100 of emitted signals 102, where emitted signals 102 are emitted with a discontinuous spectrum, in accordance with some embodiments of the present disclosure. In FIG. 1, emitted signals 102a, 102c, 102d, 102f, 102g, and 102h represent individual monofrequency signals emitted by a seismic source. Emitted signal 102b represents a sweep of frequencies where the energy level varies throughout the sweep. The energy level is primarily based upon the desired amplitude of emitted signals 102, but can also be based on the desired intensity of emitted signals 102. Emitted signal 102e represent a sweep of frequencies where the energy level is constant for all frequencies included in the sweep. Emitted signals 102 can be emitted with a discontinuous spectrum such that no signal is emitted at frequencies with a low SNR. Noise-susceptible frequencies, for example frequencies with a low SNR, can occur at any frequency in the frequency band between the minimum frequency and maximum frequency. For example, the SNR may be low below frequency 108b, between frequency 108c and frequency 108f, above frequency 108g, or at any other frequency on the spectrum. When the SNR is low, the reflected signal may be unusable and thus it may be desirable to omit or reduce a source signal emission at the noise-susceptible frequencies.

For better convenience, individual monofrequency signals may be emitted between individual frequency sweeps, as shown in FIG. 1. Emitted signals 102b and 102e are sweeps while emitted signals 102a, 102c, 102d, 102f, 102g, and 102h are monofrequencies. The monofrequency emitted signals 102a, 102c, 102d, 102f, 102g, and 102h are emitted to provide data in the gaps between emitted signals 102b and 102e, such as at frequency 108d and frequency 108e, as well as data at low frequencies, such as frequency 108a, and high frequencies, such as frequencies 108h-108j. Monofrequency signals may also be emitted when the signals are emitted at frequencies of particular interest for inversion analysis. The combination of emitted signal sweeps and monofrequencies avoids wasting energy and increases seismic exploration efficiency in noise-susceptible frequency ranges. The frequency signals to emit may also be selected based upon a rule, such as any rules defining data required for inversion algorithm analysis. The frequencies can be selected to get continuous coverage in the wavenumber domain.

The reflected signal energy from a source signal emitted with discontinuous spectrum can be processed using any suitable data processing technique, such as a compression sensing algorithm or $l_1$-norm optimization. A compression sensing algorithm is a signal processing technique for reconstructing a signal by allowing the entire signal to be determined from a few measurements or a sparse signal. Compression sensing algorithms reconstruct missing frequencies to generate sufficient data to create information in the time domain. The recovered time domain information can then be used for inversion analysis, such as full waveform inversion analysis, or any other appropriate data processing technique.

A discontinuous spectrum can also take the form of multiple frequency sub-bands, as shown in FIG. 2. FIG. 2 illustrates a graph 200 of emitted signals 202, where emitted signals 202 are emitted with a constant energy level, in accordance with some embodiments of the present disclosure. In FIG. 2, emitted signals 202a, 202b, and 202c are all constant energy frequency sweeps of frequency sub-bands. Emitted signals 202a, 202b, and 202c can be emitted from a single source or multiple sources. In the example embodiment illustrated in FIG. 2, there are no individual monofrequencies emitted. This may be due to small frequency gaps between frequency 208b and frequency 208c and frequency 208d and frequency 208e such that nonlinearity in the data associated with the reflected signals is not an issue. It may also be due to limitations caused by the seismic source such that the source is unable to generate monofrequencies. A set of frequency sub-bands can be defined by determining a set of frequency sub-bands ranging in number from 1 to n. The frequency sub-bands may have related minimum and maximum frequencies ranging from $f_{min\_1}/f_{max\_1}$ to $f_{min\_n}/f_{max\_n}$, where f is the frequency.

Similar to FIG. 2, FIG. 3 illustrates a graph 300 of emitted signals 302, where emitted signals 302 are emitted with variable energy levels, in accordance with some embodiments of the present disclosure. In FIG. 3, emitted signals 302a, 302b, and 302c are frequency sweeps of frequency sub-bands with a constantly variable energy level. A frequency sweep with a constantly variable energy level may allow for more energy to be expended at noise-susceptible frequencies. Emitting more energy at noise-susceptible frequencies may increase the reflected signal at those frequencies and result in a higher SNR. In other words, more energy is emitted at noise-susceptible frequencies within, for example, emitted signal 302a. Frequencies within emitted signal 302a that are not susceptible to noise receive less energy. This technique increases the SNR of the noise-susceptible frequencies relative to the less susceptible frequencies, resulting in the varying energy levels shown in FIG. 3. Some noise-susceptible frequencies may still be omitted from emitted signals 302, such as frequencies below frequency 308a, frequencies between frequency 308b and 308c, frequencies between 308d and 308e, and frequencies above 308f. Emitted signals 302a, 302b, and 302c can be emitted from a single source or multiple sources.

Figure 4:
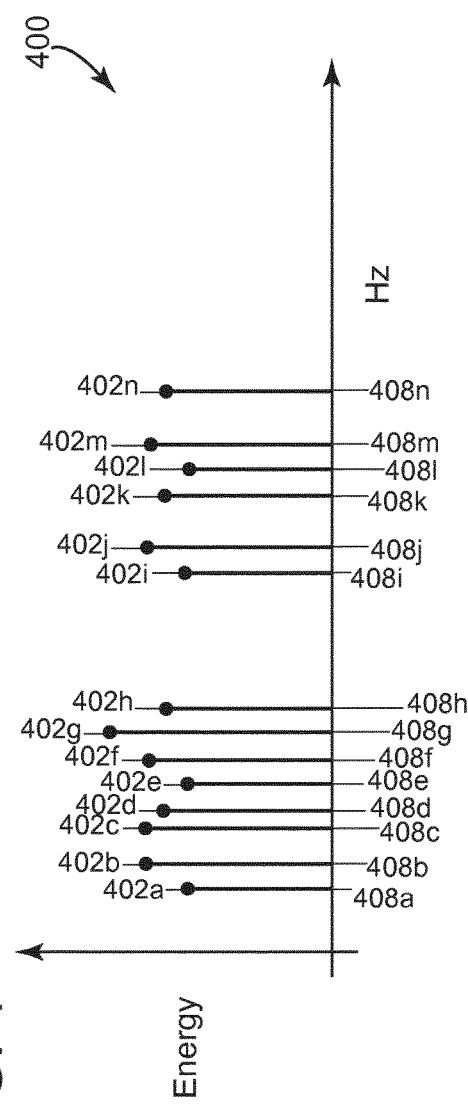
FIG. 4 illustrates a graph of emitted signals, where each emitted signal is emitted at a discrete frequency, in accordance with some embodiments of the present disclosure.

Another form of discontinuous spectrum emission is the use of only monofrequencies, as shown in FIG. 4. FIG. 4 illustrates a graph 400 of emitted signals 402, where each emitted signal 402a-402n is emitted at a discrete frequency, in accordance with some embodiments of the present disclosure. In FIG. 4, the frequency range between frequency 408h and 408i may contain noise-susceptible frequencies, therefore no spectrum is emitted in the frequency range. One advantage of the emitted spectrum disclosed in FIG. 4 is the substantial time savings with regard to signal duration. The reflected energy from emitted signals 402a-402n can be reconstructed to provide the same information as would be provided with a frequency sweep from frequency 408a to frequency 408n. Signal reconstruction would utilize compression sensing algorithms, as described with respect to FIG. 1.

The monofrequency emitted signals 402, as illustrated in FIG. 4, may be generated by a SEISMOVIE™ system designed and manufactured by CGG Services SA (Massy, France). A SEISMOVIE™ system may emit energy at individual frequencies 408a-408n, one-by-one, until approximately the entire frequency band is emitted. When emitted signals 402a-402n are generated utilizing a SEISMOVIE™ system, signals at one or more specific frequencies may not be emitted, as shown in FIG. 4, which may result in higher seismic exploration efficiency.

Figure 5A:
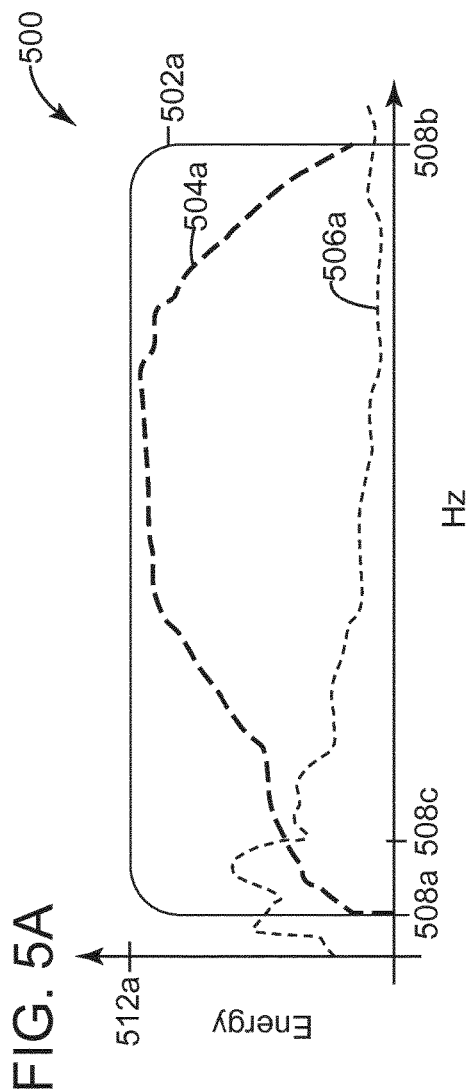
FIGS. 5A and 5B illustrate a graph of a classical continuous spectrum emission and a graph of a discontinuous spectrum emission, respectively, and the associated received signals, in accordance with some embodiments of the present disclosure.
Figure 5B:
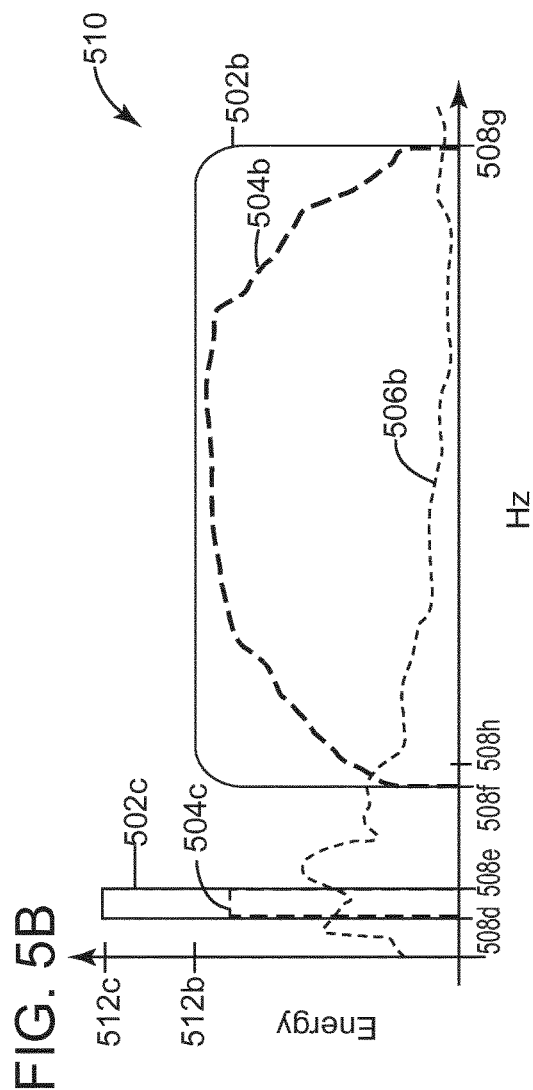

To illustrate the benefits of discontinuous spectrum emission, FIGS. 5A and 5B illustrate a graph 500 of a classical continuous spectrum emission and a graph 510 of a discontinuous spectrum emission, respectively, and associated received signals. In FIG. 5A, emitted signal 502a represents a classical continuous spectrum emission of an approximately continuous frequency signal that may be emitted at an approximately constant energy level throughout an emitted signal range. For example, starting frequency 508a may be approximately 5 hertz and ending frequency 508b may be approximately 150 hertz, such that emitted signal 502a ranges from approximately 5 to 150 hertz. Emitted signal 502a may be determined based on a particular implementation, topography of the exploration area, the capabilities of the vibration source, the projected wavelet quality or results, or any other suitable characteristic. For example, emitted signal 502a may cover a relatively large spectrum to enhance wavelet quality. As shown energy level 512a for emitted signal 502a is approximately constant throughout the frequency range of emitted signal 502a. For example, energy level 512a for emitted signal 502a may be approximately 20 decibels (dB) above the noise level. In some implementations, the energy level of emitted signal 502a may not be constant across the frequency range from frequency 508a to frequency 508c, for example the energy level of emitted signal 502a may be weaker at lower frequencies due to characteristics of the seismic energy source.

Received energy 504a corresponds to the reflected ray energy received by one or more receivers. As shown from graph 500, received energy 504a is relatively low at lower frequencies and increases to be approximately equal to energy level 512a for emitted signal 502a, and then decreases as the frequency of emitted signal 502a is increased. Received energy 504a may be affected by the density (and corresponding wave velocity), composition, thickness, or other characteristics of various subsurface layers traversed by emitted energy 502a from a vibration source. Received energy 504a may also be affected by spherical divergence.

Noise energy 506a corresponds to the noise received by the receivers at each frequency in emitted signal 502a. Noise energy 506a is due to ambient noise, interference of multiple wave types, or other sources of interference. When noise energy 506a is higher than received energy 504a at a particular frequency, the SNR at that frequency is relatively low, and thus received energy 504a may not be discernible or usable for further analysis. For example, in graph 500, at low frequencies noise energy 506a is higher than received energy 504a. Thus, at low frequencies, for example starting frequency 508a, data retrievable from received energy 504a may not be discernible or useable for further analysis. At frequency 508c, received energy 504a is approximately equivalent to or higher than noise energy 506a. At frequencies higher than frequency 508c, received energy 504a is higher than noise energy 506a. The SNR at frequencies higher than frequency 508c is relatively high such that received energy 504a may be discernible and usable for further analysis. Thus, emitted signal 502a may include noise-susceptible frequencies where emitted signal 502a produces data effectively hidden by noise such that the data is unusable for further analysis.

The issues with data hidden by noise or unusable data associated with the continuous spectrum emission shown in FIG. 5A can be addressed by using a discontinuous spectrum emission using any of the techniques described with reference to FIGS. 1-4. In FIG. 5B, emitted signals 502b and 502c represent a signal that is emitted in discontinuous sub-bands across a frequency range. Emitted signals 502b and 502c are emitted at different energy levels and intentionally omit select noise-susceptible frequencies. In some embodiments, for noise-susceptible frequencies known to have relatively high noise energy 506b, for example in the vicinity of frequency 508e, no signal is emitted. Thus, the energy ordinarily associated with the omitted frequencies may be reserved for emitting signals at other frequencies. For example, emitted signal 502b includes starting frequency 508f at approximately 10 Hertz and stopping frequency 508g at approximately 150 Hertz. However, emitted signal 502b may start as low as between one and five Hertz. Emitted signals 502b and 502c can be determined based on a particular implementation, the topography of the exploration area, the capabilities of the vibration source, the projected wavelet quality, results or any other suitable characteristic. As shown, energy level 512b for emitted signal 502b is approximately constant throughout emitted signal 502b. For example, energy level 512b for emitted signal 502b may be designed based on expected noise energy 506b, the sweep length, the sweep amplitude, and the coupling with the earth's surface. As another example, emitted signal 502c includes starting frequency 508d at approximately two Hertz and stopping frequency 508e at approximately four Hertz. However, energy level 512c for emitted signal 502c may be approximately 10 dB or more above the noise level 506b between frequency 508d and frequency 508e. Thus, energy level 512c for emitted signal 502c may be higher than energy level 512b for emitted signal 502b. As a result, received energy 504c may be enhanced and may be higher than noise energy 506b at frequencies in emitted signal 502c. For example, in FIG. 5B, received energy 504c is higher than noise energy 506b at relatively lower frequencies. Within emitted signal 502b, at relatively higher frequencies, received energy 504b and noise energy 506b are approximately the same values as received energy 504a and noise energy 506a shown in FIG. 5A, respectively. Emitted signals 502b and 502c may include a single frequency or include a range of discrete frequencies. When a signal from a source is emitted in discontinuous sub-bands at varying energy levels, the SNR at noise-susceptible frequencies, such as the frequencies within emitted signal 502c, may be increased such that received energy 504c may be discernible and usable for later analysis. Further, utilization of higher energy levels, such as energy level 512c, at noise-susceptible frequencies may enable generation of usable received energy at those frequencies, such as below frequency 508c, as shown in FIG. 5A. In contrast, a continuous emitted signal, such as emitted signal 502a as illustrated in FIG. 5A, may not generate usable received energy at frequencies below frequency 508c.

Figure 6A:
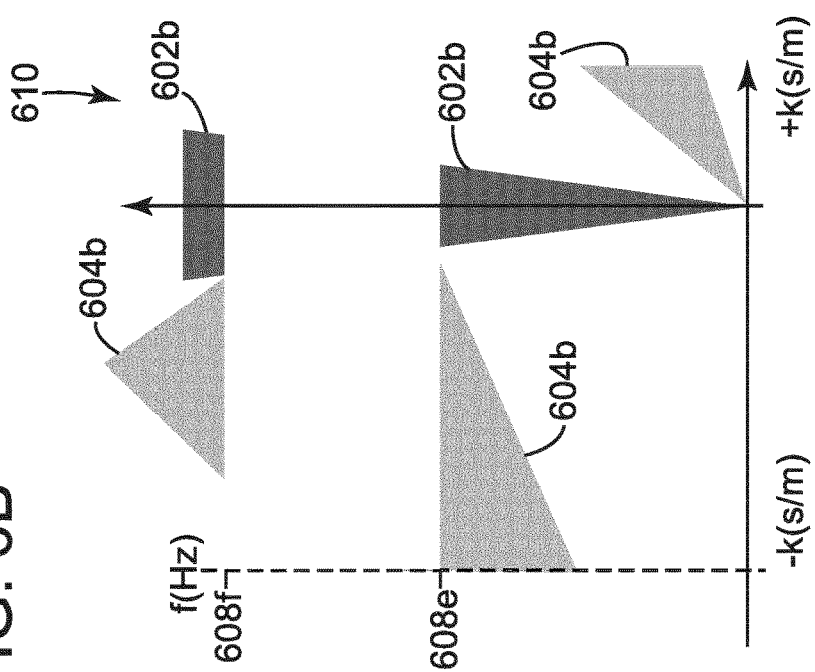
FIGS. 6A and 6B illustrate graphs of exemplary F-K transforms of the graphs shown in FIGS. 5A and 5B, respectively, in accordance with some embodiments of the present disclosure.
Figure 6B:
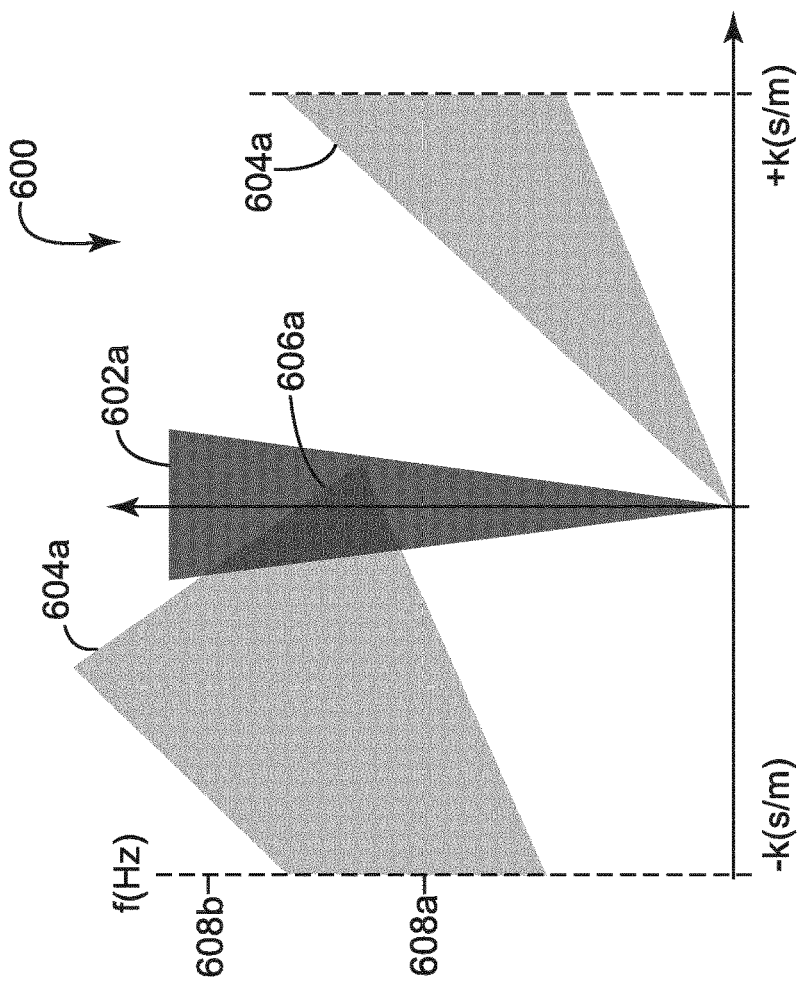

The improvements associated with the techniques applied in FIG. 5B relative to the continuous spectrum emission in FIG. 5A are also visible if the resulting data is processed using F-K transforms. FIGS. 6A and 6B illustrate graphs 600 and 610 of exemplary F-K transforms of graphs 500 and 510 shown in FIGS. 5A and 5B, respectively. An F-K transform is a two-dimensional Fourier transform over time and space. F refers to frequency (Fourier transform over time) and K refers to wave number (Fourier transform over space). An F-K transform includes frequency along a vertical axis and wave number along a horizontal axis. Spatial aliasing may arise when performing data processing with F-K transforms. Spatial aliasing may occur when excess space exists between receivers. The emitted signal may be repeated, or aliased, in the frequency domain and aliasing may introduce noise in the form of repeated signals. Therefore, techniques that minimize or eliminate aliasing are preferred.

Accordingly, FIG. 6A illustrates an example F-K transform graph 600 of a continuous spectrum emission, such as emitted signal 502a shown with reference to FIG. 5A. Emitted signal 602a may be aliased or overlapping with noise energy 604a, as shown by aliased or overlapping region 606a. Aliased or overlapping region 606a may occur in an aliased frequency range from frequency 608a to frequency 608b. Reducing aliased or overlapping regions may cause data processing issues and render the data recorded in the region where the noise energy overlaps the emitted signal unusable.

In contrast, FIG. 6B illustrates an example F-K transform graph 610 of a signal emitted in discontinuous frequency sub-bands, such as emitted signals 502b and 502c shown with reference to FIG. 5B. Emitted signal 602b may be configured to not emit a signal at frequencies in an aliased or overlapping frequency range, for example, where no frequency may be emitted between frequency 608e and frequency 608f. As a result, spatial aliasing and signal overlap is eliminated from the frequency range between frequency 608f and frequency 608g. Reducing or eliminating spatially aliased or overlapping data can reduce the introduction of artifacts and noise into data processing.

FIG. 7 illustrates a flow chart of an example method 700 for discontinuous spectrum emission in seismic exploration in accordance with some embodiments of the present disclosure. Emitting a discontinuous frequency spectrum may increase the SNR at noise-susceptible frequencies by emitting a frequency at a higher energy in the noise-susceptible frequency band. Further, a source designed to emit a discontinuous frequency spectrum may be operable to not emit a signal in noise-susceptible frequency bands and thus increase seismic exploration efficiency.

The method 700 begins at step 702, where the sweep design algorithm determines a minimum frequency to emit. In step 704, the sweep design algorithm selects a maximum frequency to emit. The minimum frequency to emit and maximum frequency to emit can be defined based on a particular implementation, the topography of the exploration area, the capabilities of the seismic energy source, the projected wavelet quality or results or any other suitable characteristic. For example, in FIG. 5B, frequency 508d is the minimum frequency and frequency 508g is the maximum frequency. The minimum and maximum frequencies may be selected based on a noise test performed prior to the method 700. The noise test may be used to determine one or more frequencies that may have high noise energy.

In step 706, the sweep design algorithm identifies at least one noise-susceptible frequency within the band between the minimum frequency, as determined in step 702, and the maximum frequency, as selected in step 704. There may be one or more noise-susceptible frequencies where noise energy may be higher than reflected energy and, as a result, where a corresponding SNR is low. The noise-susceptible frequency may also be a set of contiguous frequencies such that, in step 706, the sweep design algorithm identifies a noise-susceptible frequency band. For example, in FIG. 5A noise energy 506a is higher than received energy 504a between frequency 508a and frequency 508c. Thus particular frequencies between frequency 508a and frequency 508c may be identified as noise-susceptible frequencies. At the noise-susceptible frequencies, the received energy may be of limited value or unusable due to noise energy. Determination of a noise-susceptible frequency may be made based on previously generated data, topology of the exploration area, characteristics of the vibration source, a noise test, or any other suitable characteristic. Repetitive surveys are common in seismic exploration. After an initial seismic survey (or test survey), the data recorded during the initial survey is reviewed. The identifications performed in step 702, step 704 or step 706 may be based upon the initial survey data. The identifications performed in step 702, step 704, or step 706 may also be based upon data processing requirements.

In step 708, the sweep design algorithm determines the energy level to emit for a specific frequency or a frequency sub-band. One example of a frequency sub-band is defined by the frequency band starting at the minimum frequency, as determined in step 702, and ending at approximately the first noise-susceptible frequency, as defined in step 706. For example, in FIG. 5B, one frequency sub-band is defined as the band starting at frequency 508d and ending at frequency 508e. Another frequency sub-band is defined as the band starting at frequency 508f and ending at frequency 508g. The energy level determined in step 708 may be the same energy level for each emitted discrete or sub-band signal or the signal may be emitted at a different energy level for at least one emitted discrete or sub-band signal. For example, for noise-susceptible frequency sub-bands the signal can be emitted at a higher energy level to increase the SNR for frequencies within the noise-susceptible frequency sub-bands. In FIG. 5B, for example, the frequency sub-band bounded by frequencies 508d and 508e is emitted at energy level 512c. Received energy 504c is at a higher energy level than noise energy 506b in this band. In some embodiments, the frequency sub-bands identified in step 708 may include one or more noise-susceptible frequencies because when a higher energy level is emitted the SNR is increased such that the data is no longer unusable. For example, in FIG. 5B, the higher energy of emitted signal 502c increases received energy 504c such that received energy 504c is higher than noise energy 506b.

In step 710, the sweep design algorithm determines if all undesirable noise-susceptible frequencies, as determined in step 706, have been identified. If all undesirable noise-susceptible frequencies have been identified the sweep design algorithm proceeds to step 712, otherwise the sweep design algorithm returns to step 704 to identify the next noise-susceptible frequency. For example, with respect to FIG. 5A, the sweep design algorithm may return to step 706 until each frequency between frequency 508a and 508c has been identified. There may be any number of noise-susceptible frequencies, depending upon the characteristics of the seismic energy source, topography, spherical divergence, ambient noise, interference, or any other variable that impacts the SNR.

In step 712, the sweep design algorithm designs a seismic signal that can be emitted by a seismic energy source. The seismic signal may include a range of frequencies between the minimum frequency, as determined in step 702, and the maximum frequency, as selected in step 704, but may omit a band of frequencies that includes one or more noise-susceptible frequencies or noise-susceptible frequency bands or may reduce the energy level used to emit the signals, as identified in step 706. The sweep design algorithm may also design a seismic signal that may omit or reduce the energy level for certain frequencies or frequency bands based on increasing the seismic exploration efficiency in addition, or instead of, omitting noise-susceptible frequencies or frequency bands. Thus the seismic signal may be a collection of discontinuous frequency sub-bands that collectively cover the desired frequency spectrum from the minimum frequency to the maximum frequency without emitting particular noise-susceptible frequencies. The seismic signal may be designed to emit each frequency sub-band signal at the energy level determined in step 708. For the example shown in FIG. 5B, the source emits spectrum from frequency 508d to frequency 508e at energy level 512c. The source then emits spectrum from frequency 508f to frequency 508g at energy level 512b. The seismic signal may also be designed to emit a collection of monofrequency signals, as illustrated in FIG. 4, or may be designed to emit a combination of frequency sub-band signals and monofrequency signals, as shown in FIG. 1. In step 714, the designed signal is emitted. The signal can be emitted by a single source or multiple sources. The frequency signals to emit may also be selected based upon a rule, such as any rules defining data required for inversion algorithm analysis or requirements for continuous coverage in the wavenumber domain. In addition, the frequency signals to emit may be based on minimizing spatial aliasing, as discussed in FIG. 6B.

The steps of method 700 can be performed by a user, various computer programs, models, or any combination thereof, configured to simulate and design seismic exploration signal systems, apparatuses, or devices. The programs and models may include instructions stored on a computer readable medium and operable to perform, when executed, one or more of the steps described above. The computer readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user or computer programs and models used to simulate and design seismic exploration systems may be referred to as a "sweep design algorithm."

Modifications, additions, or omissions may be made to method 700 without departing from the scope of the present disclosure. For example, the order of the steps may be performed in a different manner than that described and some steps may be performed at the same time. Additionally, each individual step may include additional steps without departing from the scope of the present disclosure. Further, more steps may be added or steps may be removed without departing from the scope of the disclosure.

Figure 8:
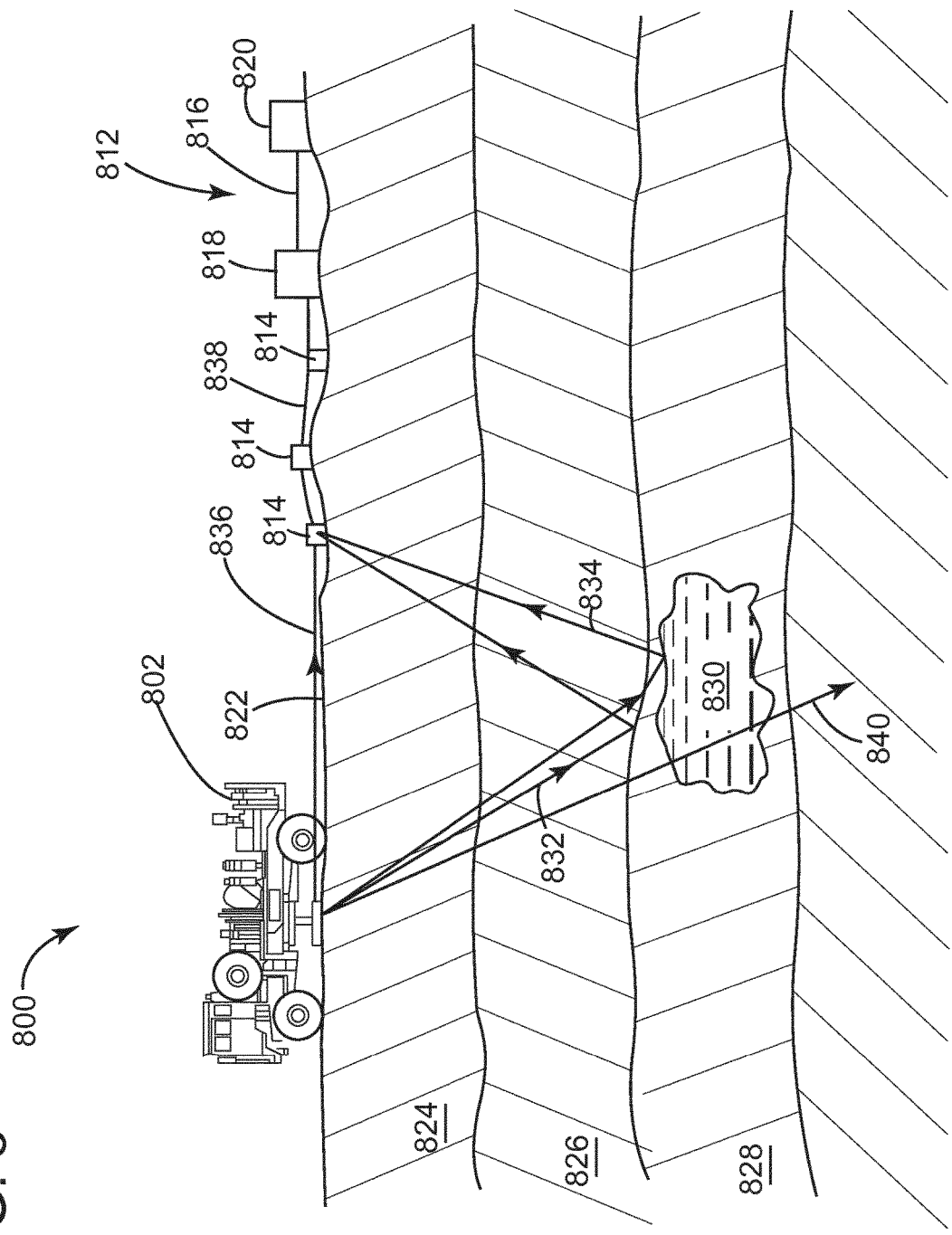
FIG. 8 illustrates an elevation view of an example seismic exploration system configured to produce images of the earth's subsurface geological structure in accordance with some embodiments of the present disclosure.

The method described with reference to FIG. 7 and the prior figures is used to enhance the effectiveness of a system used to emit seismic signals, receive reflected signals, and process the resulting data to image the earth's subsurface. FIG. 8 illustrates an elevation view of an example seismic exploration system 800 configured to produce images of the earth's subsurface geological structure in accordance with some embodiments of the present disclosure. The images produced by system 800 allow for the evaluation of subsurface geology. System 800 may include one or more seismic energy sources 802 and one or more receivers 814 which are located within a pre-determined exploration area. The exploration area may be any defined area selected for seismic survey or exploration. Survey of the exploration area may include the activation of seismic source 802 that radiates an acoustic wave field that expands downwardly through the layers beneath the earth's surface. The seismic wave field is then partially reflected from the respective layers as a wave front recorded by receivers 814. For example, source 802 generates seismic waves and receivers 814 record rays 832 and 834 reflected by interfaces between subsurface layers 824, 826, and 828, oil and gas reservoirs, such as target reservoir 830, or other subsurface structures. Subsurface layers 824, 826, and 828 may have various densities, thicknesses, or other characteristics. Target reservoir 830 may be separated from surface 822 by multiple layers 824, 826, and 828. As the embodiment depicted in FIG. 8 is exemplary only, there may be more or fewer layers 824, 826, or 828 or target reservoirs 830. Similarly, there may be more or fewer rays 832 and 834. Additionally, some source waves will not be reflected, as illustrated by ray 840.

Seismic energy source 802 may be referred to as an acoustic source, seismic source, energy source, and source 802. In some embodiments, source 802 is located on or proximate to surface 822 of the earth within an exploration area. A particular source 802 may be spaced apart from other similar sources. Source 802 may be operated by a central controller that coordinates the operation of several sources 802. Further, a positioning system, such as a global positioning system (GPS), may be utilized to locate and time-correlate sources 802 and receivers 814. Multiple sources 802 may be used to improve testing efficiency, provide greater azimuthal diversity, improve the signal to noise ratio, and improve spatial sampling. The use of multiple sources 802 can also input a stronger signal into the ground than a single, independent source 802. Sources 802 may also have different capabilities and the use of multiple sources 802 may allow for some sources 802 to be used at lower frequencies in the spectrum and other sources 802 at higher frequencies in the spectrum.

Source 802 may comprise any type of seismic device that generates controlled seismic energy used to perform reflection or refraction seismic surveys, such as a seismic vibrator, vibroseis, dynamite, an air gun, a thumper truck, or any other suitable seismic energy source. For example, the seismic signal designed in step 712 as described in FIG. 7 may be emitted in step 714 by source 802.

Source 802 may radiate varying frequencies or one or more monofrequencies of seismic energy into surface 822 and subsurface formations during a defined interval of time. Source 802 may impart energy through a sweep of multiple frequencies or at a single monofrequency, or through a combination of at least one sweep and at least one monofrequency, as described with respect to FIGS. 1-4. A signal may be discontinuous so that source 802 does not generate particular frequencies between the starting and stopping frequency and receivers 814 do not receive or report data at the particular frequencies.

Seismic exploration system 800 may include monitoring device 812 that operates to record reflected energy rays 832, 834, and 836. Monitoring device 812 may include one or more receivers 814, network 816, recording unit 818, and processing unit 820. In some embodiments, monitoring device 812 may be located remotely from source 802.

Receiver 814 may be located on or proximate to surface 822 of the earth within an exploration area. Receiver 814 may be any type of instrument that is operable to transform seismic energy or vibrations into a voltage signal. For example, receiver 814 may be a vertical, horizontal, or multicomponent geophone, accelerometers, or optical fiber with wire or wireless data transmission, such as a three component (3C) geophone, a 3C accelerometer, or a 3C Digital Sensor Unit (DSU). Multiple receivers 814 may be utilized within an exploration area to provide data related to multiple locations and distances from sources 802. Receivers 814 may be positioned in multiple configurations, such as linear, grid, array, or any other suitable configuration. In some embodiments, receivers 814 may be positioned along one or more strings 838. Each receiver 814 is typically spaced apart from adjacent receivers 814 in the string 838. Spacing between receivers 814 in string 838 may be approximately the same preselected distance, or span, or the spacing may vary depending on a particular application, exploration area topology, or any other suitable parameter. Receivers 814 record received energy 504*b* and noise energy 506*b*, as described with respect to FIG. 5B.

One or more receivers 814 transmit raw seismic data from reflected seismic energy, such as received energy 504*b* and noise energy 506*b* from FIG. 5B, via network 816 to recording unit 818. Recording unit 818 transmits raw seismic data to processing unit 820 via network 816. Processing unit 820 performs seismic data processing on the raw seismic data to prepare the data for interpretation. For example, processing unit 820 may perform the compression sensing algorithm and full waveform inversion techniques described in FIG. 1. Although discussed separately, recording unit 818 and processing unit 820 may be configured as separate units or as a single unit. Recording unit 818 or processing unit 820 may include any instrumentality or aggregation of instrumentalities operable to compute, classify, process, transmit, receive, store, display, record, or utilize any form of information, intelligence, or data. For example, recording unit 818 and processing unit 820 may include one or more personal computers, storage devices, servers, or any other suitable device and may vary in size, shape, performance, functionality, and price. Recording unit 818 and processing unit 820 may include random access memory (RAM), one or more processing resources, such as a central processing unit (CPU) or hardware or software control logic, or other types of volatile or non-volatile memory. Additional components of recording unit 818 and processing unit 820 may include one or more disk drives, one or more network ports for communicating with external devices, one or more input/output (I/O) devices, such as a keyboard, a mouse, or a video display. Recording unit 818 or processing unit 820 may be located in a station truck or any other suitable enclosure.

Network 816 may be configured to communicatively couple one or more components of monitoring device 812 with any other component of monitoring device 812. For example, network 816 may communicatively couple receivers 814 with recording unit 818 and processing unit 820. Further, network 814 may communicatively couple a particular receiver 814 with other receivers 814. Network 814 may be any type of network that provides communication, such as one or more of a wireless network, a local area network (LAN), or a wide area network (WAN), such as the Internet. For example, network 814 may provide for communication of reflected energy 504*b* and noise energy 506*b* from receivers 814 to recording unit 818 and processing unit 820.

The seismic survey emitted by source 802 may be repeated at various time intervals to determine changes in target reservoir 830. The time intervals may be months or years apart. Data may be collected and organized based on offset distances, such as the distance between a particular source 802 and a particular receiver 814 and the amount of time it takes for rays 832 and 834 from a source 802 to reach a particular receiver 814. Data collected during a survey by receivers 814 may be reflected in traces that may be gathered, processed, and utilized to generate a model of the subsurface structure or variations of the structure, for example 4D monitoring.

Although discussed with reference to a land implementation, embodiments of the present disclosure are also useful in marine applications. In a marine application, monitoring device 812 may include hydrophones or accelerometers contained inside buoyant streamers, which may be towed behind a vessel. Source 802 and monitoring device 412 may be towed behind the same or a different vessel. Embodiments of the present disclosure may also be used in a seabed acquisition application. In a seabed acquisition application, where receiver 814 is placed on the seabed, monitoring device 812 may include 3C geophone and hydrophones.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. For example, the emitted signals 102 in FIG. 1 may be any combination of seismic sweeps and monofrequencies. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, a receiver does not have to be turned on but must be configured to receive reflected energy.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. The computer processor may perform the steps of a sweep design algorithm as described in method 700 in FIG. 7.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability. For example, the sweep design algorithm described in method 700 with respect to FIG. 7 may be stored in tangible computer readable storage media.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the invention is defined by the appended claims.

What is claimed is:

1. A method of discontinuous spectrum emission in seismic exploration, comprising:
   determining a minimum frequency to be emitted by a seismic source in a frequency spectrum;
   selecting a maximum frequency to be emitted by the seismic source in the frequency spectrum;
   identifying a noise-susceptible portion of the frequency spectrum between the minimum frequency and the maximum frequency; and
   emitting, by the seismic source, a seismic signal within the frequency spectrum, wherein a reduced signal is emitted in the identified noise-susceptible portion of the frequency spectrum.

2. The method of claim 1, wherein emitting the seismic signal includes emitting at least one of a discrete frequency or a frequency sub-band.

3. The method of claim 1, wherein a portion of the seismic signal is emitted by a second seismic source.

4. The method of claim 1, further comprising:
   determining a set of frequency sub-bands within the minimum frequency and the maximum frequency, each frequency sub-band is a range of frequencies within the frequency spectrum; and
   wherein emitting the seismic signal is further according to each range of frequencies in each frequency sub-band.

5. The method of claim 4, further comprising:
   identifying a frequency sub-band that includes the identified noise-susceptible portion of the frequency spectrum; and
   wherein emitting the seismic signal includes omitting the frequency sub-band that includes the noise-susceptible portion.

6. The method of claim 1, further comprising determining an energy level at which to emit a particular frequency within the frequency spectrum.

7. The method of claim 6, wherein the energy level for the particular frequency is based on a received energy being higher than a noise energy.

8. The method of claim 1, further comprising selecting the frequency spectrum to emit based on at least one of a rule, minimization of aliasing in an F-K domain, minimization of overlapping regions in the F-K domain, an inversion algorithm analysis requirement, or identification of a noise-susceptible frequency.

9. A seismic exploration system, comprising:
   a seismic source configured to: emit a seismic signal into a subsurface geology, wherein the seismic signal is based on:
      determining a minimum frequency to be emitted by the seismic source in a frequency spectrum;
      selecting a maximum frequency to be emitted by the seismic source in the frequency spectrum;
      identifying a noise-susceptible portion of the frequency spectrum between the minimum frequency and the maximum frequency, wherein a reduced signal is emitted by the seismic source in the identified noise-susceptible portion of the frequency spectrum; and
   a receiver configured to receive energy from the seismic source reflected off of the subsurface geology.

10. The seismic exploration system of claim 9, wherein the seismic signal is further based on determining at least one of a discrete frequency to emit or a frequency sub-band to emit.

11. The seismic exploration system of claim 9, wherein a portion of the seismic signal is emitted by a second seismic source.

12. The seismic exploration system of claim 9, wherein the seismic signal is further based on determining a set of frequency sub-bands within the related minimum frequency and the maximum frequency, each frequency sub-band is a range of frequencies within the frequency spectrum.

13. The seismic exploration system of claim 9, wherein the seismic signal is further based on determining an energy level at which to emit a particular frequency in the frequency spectrum.

14. The seismic exploration system of claim 9, wherein the seismic signal is further based on selecting the frequency spectrum to emit based on at least one of a rule, minimization of aliasing in an F-K domain, minimization of overlapping regions in the F-K domain, an inversion algorithm analysis requirement, or identification of a noise-susceptible frequency.

15. A non-transitory computer-readable medium, comprising:
   computer-executable instructions carried on the computer-readable medium, the instructions, when executed, causing a processor to:
      determine a minimum frequency to be emitted by a seismic source in a frequency spectrum;

select a maximum frequency to be emitted by the seismic source in the frequency spectrum;

identify a noise-susceptible portion of the frequency spectrum between the minimum frequency and the maximum frequency; and control the source to emit a seismic signal according to the frequency spectrum, wherein a reduced signal is emitted in the identified noise-susceptible portion of the frequency spectrum.

16. The non-transitory computer-readable medium of claim 15, wherein emitting the seismic signal includes emitting at least one of a discrete frequency or a frequency sub-band.

17. The non-transitory computer-readable medium of claim 15, wherein a portion of the seismic signal is emitted by a second seismic source.

18. The non-transitory computer-readable medium of claim 15, further comprising instructions, when executed, causing a processor to:

determine a set of frequency sub-bands between the minimum frequency and the maximum frequency, each frequency sub-band is a range of frequencies within the frequency spectrum; and wherein emitting the seismic signal is further according to each range of frequencies in each frequency sub-band.

19. The non-transitory computer-readable medium of claim 15, further comprising instructions, when executed, causing a processor to determine an energy level at which to emit a particular frequency in the frequency spectrum.

20. The non-transitory computer-readable medium of claim 15, further comprising instructions, when executed, causing a processor to select the frequency spectrum to emit based on at least one of a rule, minimization of aliasing in an F-K domain, minimization of overlapping regions in the F-K domain, an inversion algorithm analysis requirement, or identification of a noise-susceptible frequency.

* * * * *